(12) United States Patent
Kim et al.

(10) Patent No.: US 9,570,738 B2
(45) Date of Patent: Feb. 14, 2017

(54) POSITIVE ACTIVE MATERIAL, POSITIVE ELECTRODE AND LITHIUM BATTERY INCLUDING THE POSITIVE ACTIVE MATERIAL, AND METHOD OF MANUFACTURING THE POSITIVE ACTIVE MATERIAL

(71) Applicant: Samsung SDI Co., Ltd., Yongin-si, Gyeonggi-do (KR)

(72) Inventors: Ji-Hyun Kim, Yongin-si (KR); Hyun-Joo Je, Yongin-si (KR); Chang-Wook Kim, Yongin-si (KR); Yong-Chan You, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 118 days.

(21) Appl. No.: 14/582,964

(22) Filed: Dec. 24, 2014

(65) Prior Publication Data
US 2015/0228971 A1     Aug. 13, 2015

(30) Foreign Application Priority Data
Feb. 7, 2014     (KR) .................. 10-2014-0014447

(51) Int. Cl.
*H01M 4/36*     (2006.01)
*H01M 4/525*    (2010.01)
(Continued)

(52) U.S. Cl.
CPC .......... *H01M 4/366* (2013.01); *H01M 4/0402* (2013.01); *H01M 4/0471* (2013.01);
(Continued)

(58) Field of Classification Search
CPC ............... H01M 10/0525; H01M 2220/20; H01M 2220/30; H01M 4/0402; H01M 4/0471; H01M 4/13; H01M 4/139; H01M 4/1391; H01M 4/366; H01M 4/485; H01M 4/505; H01M 4/525
See application file for complete search history.

(56) References Cited

U.S. PATENT DOCUMENTS

2011/0244337 A1   10/2011   Ohta et al.
2012/0251882 A1   10/2012   Moon et al.
(Continued)

FOREIGN PATENT DOCUMENTS

JP     2010-140664 A     6/2010
JP     2010-272344 A     12/2010
(Continued)

OTHER PUBLICATIONS

EPO Search Report dated Jun. 8, 2015, for corresponding European Patent application 15152118.4, (6 pages).
(Continued)

*Primary Examiner* — Carlos Barcena
(74) *Attorney, Agent, or Firm* — Lewis Roca Rothgerber Christie LLP

(57) ABSTRACT

A positive active material, a positive electrode and a lithium battery containing the positive active material, and a method of manufacturing the positive active material are disclosed. The positive active material includes: a positive active material core particle for intercalating and deintercalating lithium ions; and a coating layer at least partially surrounding the positive active material core particle and including a ceramic composite represented by Formula 1.

$$Li_{7+a}La_{3-b}Zr_{2-c}M_dO_{12+e}$$     Formula 1

In Formula 1, M comprises at least one selected from aluminum (Al), titanium (Ti), scandium (Sc), vanadium (V), yttrium (Y), niobium (Nb), hafnium (Hf), tantalum (Ta),
(Continued)

silicon (Si), gallium (Ga), and germanium (Ge), and $-1 \leq a \leq 1$, $0 \leq b \leq 2$, $0 \leq c \leq 2$, $0 \leq d \leq 2$, and $0 \leq e \leq 1$.

20 Claims, 4 Drawing Sheets

(51) Int. Cl.
  *H01M 4/1391* (2010.01)
  *H01M 10/0525* (2010.01)
  *H01M 4/04* (2006.01)
  *H01M 4/485* (2010.01)
  *H01M 4/505* (2010.01)
  *H01M 4/13* (2010.01)
  *H01M 4/139* (2010.01)

(52) U.S. Cl.
  CPC ........... *H01M 4/13* (2013.01); *H01M 4/1391* (2013.01); *H01M 4/485* (2013.01); *H01M 4/505* (2013.01); *H01M 4/525* (2013.01); *H01M 10/0525* (2013.01); *H01M 4/139* (2013.01); *H01M 2220/20* (2013.01); *H01M 2220/30* (2013.01); *Y02E 60/122* (2013.01)

(56) References Cited

U.S. PATENT DOCUMENTS

| | | |
|---|---|---|
| 2013/0344416 A1 | 12/2013 | Sakamoto et al. |
| 2014/0377655 A1 | 12/2014 | Mun et al. |

FOREIGN PATENT DOCUMENTS

| | | |
|---|---|---|
| JP | 2011-113655 A | 6/2011 |
| JP | 2011-159528 A | 8/2011 |
| JP | 2013-62190 A | 4/2013 |
| JP | 2013-196968 A | 9/2013 |

OTHER PUBLICATIONS

Patent Abstracts of Japan and Machine English Translation of JP 2010-140664A, Jun. 24, 2010, 17 Pages.

Patent Abstracts of Japan and Machine English Translation of JP 2011-113655 A, Jun. 9, 2011, 33 Pages.

Patent Abstracts of Japan and Machine English Translation of JP 2011-159528 A, Aug. 18, 2011, 28 Pages.

Patent Abstracts of Japan and Machine English Translation of JP 2013-62190 A, Apr. 4, 2013, 34 Pages.

Patent Abstracts of Japan and Machine English Translation of JP 2013-196968 A, Sep. 30, 2013, 38 Pages.

POSITIVE ACTIVE MATERIAL, POSITIVE ELECTRODE AND LITHIUM BATTERY INCLUDING THE POSITIVE ACTIVE MATERIAL, AND METHOD OF MANUFACTURING THE POSITIVE ACTIVE MATERIAL

CROSS-REFERENCE TO RELATED APPLICATION

This application claims priority to and the benefit of Korean Patent Application No. 10-2014-0014447, filed on Feb. 7, 2014, the entire content of which is incorporated herein by reference.

BACKGROUND

1. Field

One or more aspects of embodiments of the present disclosure relate to a positive active material, a positive electrode and a lithium battery including the positive active material, and a method of manufacturing the positive active material.

2. Description of the Related Art

With the development of small high-tech devices such as digital cameras, mobile devices, laptops, and computers, the demand for a lithium secondary battery as an energy source has rapidly increased. In addition, with the spread of hybrid and plug-in electric vehicles (e.g., hybrid electric vehicle or HEV, plug-in hybrid electric vehicle or PHEV, and electric vehicle or EV) by the name of xEV, the development of a safe lithium-ion battery of high capacity is ongoing.

In order to realize a lithium battery consistent with the purposes described above, a variety of positive active materials are being considered.

As the positive active material for the lithium-ion battery, a single-component lithium cobalt oxide ($LiCoO_2$) has been mainly used, but alternatively, there is a current trend of using a high-capacity, layered lithium composite metal oxide (e.g., $Li(Ni\text{—}Co\text{—}Mn)O_2$, $Li(Ni\text{—}Co\text{—}Al)O_2$, etc.). In addition, a highly safe spinel-type lithium manganese oxide ($LiMn_2O_4$) and an olivine-type lithium iron phosphate ($LiFePO_4$) have also attracted attention.

During charge and discharge cycles of a lithium battery, a variety of coating layers may be formed to suppress (or reduce) a reaction between the positive active material and an electrolyte solution so as to improve lifetime of the lithium battery.

According to the related art, the coating material for the positive active material is mostly a metal oxide, which blocks a direct reaction with the electrolyte solution during the charge and discharge cycles so as to improve a lifetime of the positive active material. However, such a coating material is electrically inactive, and thus, as the positive active material is coated with more of the coating material, the capacity and rate property (i.e., charge and discharge rates) of the positive active material decrease. Accordingly, the lithium ion battery including the positive active material may have a structure in which the intercalation and deintercalation of lithium ions is difficult.

Therefore, in comparison with the coating material of the related arts, the development of new coating materials having no degradation in rate property or having a very low rate property in addition to improved lifetime properties is beneficial.

SUMMARY

One or more aspects of embodiments of the present disclosure are directed toward a positive active material that can improve lifetime and rate properties of a lithium battery.

One or more aspects of embodiments of the present disclosure are directed toward a positive electrode including the positive active material.

One or more aspects of embodiments of the present disclosure are directed toward a lithium battery including the positive electrode.

One or more aspects of embodiments of the present disclosure are directed toward a method of manufacturing the positive active material.

Additional aspects will be set forth in part in the description which follows and, in part, will be apparent from the description, or may be learned by practice of the presented embodiments.

According to one or more embodiments of the present disclosure, a positive active material includes: a positive active material core particle for intercalating and deintercalating lithium ions; and a coating layer at least partially surrounding the positive active material core particle and including a ceramic composite represented by Formula 1:

Formula 1 where, in Formula 1, M includes at least one selected from aluminum (Al), titanium (Ti), scandium (Sc), vanadium (V), yttrium (Y), niobium (Nb), hafnium (Hf), tantalum (Ta), silicon (Si), gallium (Ga), and germanium (Ge), and
$-1 \leq a \leq 1$, $0 \leq b \leq 2$, $0 \leq c \leq 2$, $0 < d \leq 2$, and $0 \leq e \leq 1$.

In some embodiments, the ceramic composite may be represented by Formula 2:

Formula 2 where, in Formula 2, M includes at least one selected from Al, Ti, Sc, V, Y, Nb, Hf, Ta, Si, Ga, and Ge, and
$-0.5 \leq a' \leq 0.5$, $0 \leq b' \leq 1$, $0 \leq c' \leq 1$, $0 \leq d' \leq 1$, and $0 \leq e' \leq 0.5$.

In some other embodiments, the ceramic composite may be represented by Formula 3:

Formula 3 where, in Formula 3, $0 < b'' \leq 2$ and $0 < d'' \leq 2$.

In some other embodiments, the ceramic composite may be represented by Formula 4:

Formula 4 where, in Formula 4, $0 < c''' < 2$ and $0 < d''' < 2$.

In some other embodiments, the ceramic composite may be represented by Formula 5:

Formula 5 where, in Formula 5, $0 \leq x \leq 2$, $0 \leq y \leq 2$, and $0 < x+y \leq 2$.

The coating layer may be discontinuous.

The coating layer may include coating particles including the ceramic composite. The coating particles may have an average particle diameter in a range of about 100 nm to about 1,000 nm.

The coating layer may have a thickness in a range of about 100 nm to about 1,000 nm.

The positive active material core particle may include $LiCoO_2$; $LiNiO$; $LiMnO_2$; $LiMn_2O_4$; $Li(Ni_aCo_bMn_c)O_2$, where $0<a<1$, $0<b<1$, $0<c<1$, $a+b+c=1$; $LiNi_{1-y}Co_yO_2$, where $0 \leq y<1$; $LiCo_{1-y}Mn_yO_2$, where $0 \leq y<1$; $LiNi_{1-y}Mn_yO_2$, where $0 \leq y<1$; $LiMn_{2-z}Ni_zO_4$, where $0<z<2$; $LiMn_{2-z}Co_zO_4$, where $0<z<2$; $V_2O_5$; TiS; and MoS.

The positive active material may have an operating potential in a range of about 4.0 V to about 5.5 V.

The positive active material core particle may have an average particle diameter in a range of about 1 μm to about 30 μm.

The coating layer may be present in the positive active material at a mole ratio in a range of about 0.05 to about 5 mol % based on 1 mole of the positive active material core particle.

According to other embodiments, a positive electrode includes the positive active material.

According to other embodiments, a lithium battery includes the positive electrode.

According to other embodiments, a method of manufacturing the positive active material includes:

preparing a mixed solution containing a lanthanum (La) precursor, a zirconium (Zr) precursor, and an additive metal M, where M includes at least one selected from Al, Ti, Sc, V, Y, Nb, Hf, Ta, Si, Ga, and Ge);

adding a weak acid including citric acid, lactic acid, acetic acid, formic acid, oxalic acid, uric acid, or a mixture thereof, to the mixed solution to prepare a coating solution;

applying a coating of the coating solution onto a surface of a positive active material core particle capable of intercalating and deintercalating lithium ions; and heat-treating the coating to prepare the positive active material.

BRIEF DESCRIPTION OF THE DRAWINGS

These and/or other aspects will become more apparent and more readily appreciated by reference to the following description when considered together with the accompanying drawings in which.

DETAILED DESCRIPTION

Figure 1:
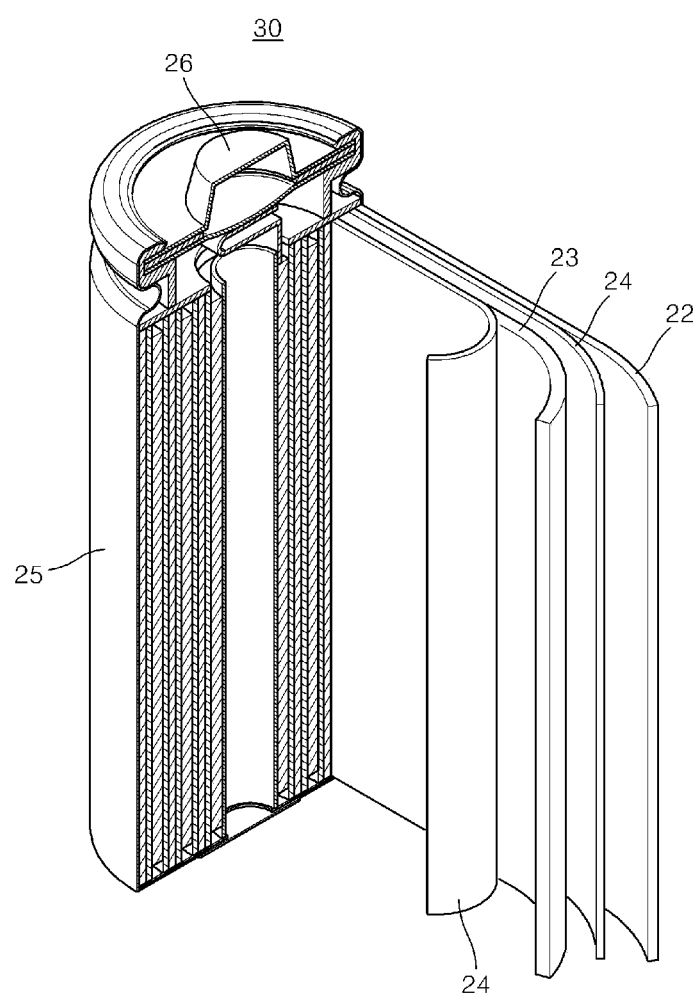
FIG. 1 is a schematic view illustrating a structure of a lithium battery according to an embodiment.

Reference will now be made in detail to certain embodiments, examples of which are illustrated in the accompanying drawings, where like reference numerals refer to like elements throughout. As those skilled in the art would recognize, the described embodiments may be modified in many ways and, therefore, should not be construed as being limited to the descriptions set forth herein. Accordingly, the embodiments are described below, by referring to the figures, merely to explain aspects of the present description. As used herein, the term "and/or" includes any and all combinations of one or more of the associated listed items. Expressions such as "at least one of," when preceding a list of elements, modify the entire list of elements and do not modify the individual elements of the list. Also, in the context of the present application, when a first element is referred to as being "on" a second element, it can be directly on the second element or be indirectly on the second element with one or more intervening elements interposed therebetween. Further, the use of "may" when describing embodiments of the present disclosure refers to "one or more embodiments of the present disclosure."

A positive active material according to an embodiment includes a positive active material core particle capable of intercalating and deintercalating lithium ions; and a coating layer at least partially surrounding (or formed on) the positive active material core particle and including a ceramic composite represented by Formula 1:

$$Li_{7+a}La_{3-b}Zr_{2-c}M_dO_{12+e}$$ Formula 1 where, in Formula 1, M may include at least one metal including aluminum (Al), titanium (Ti), scandium (Sc), vanadium (V), yttrium (Y), niobium (Nb), hafnium (Hf), tantalum (Ta), silicon (Si), gallium (Ga), and/or germanium (Ge), and $-1 \leq a \leq 1$, $0 \leq b \leq 2$, $0 \leq c \leq 2$, $0 < d \leq 2$, and $0 \leq e \leq 1$.

The positive active material core particle may be capable of intercalating and deintercalating lithium ions, and the positive active material core particle may include any suitable positive active material available in the art.

For example, the positive active material core particle may include at least one compound represented by any one of $Li_aA_{1-b}B_bD_2$ (where $0.90 \leq a \leq 1.8$ and $0 \leq b \leq 0.5$); $Li_aE_{1-b}B_bO_{2-c}D_c$ (where $0.90 \leq a \leq 1.8$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In some embodiments, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The positive active material may have an operating potential in a range of about 4.0 V to about 5.5 V. For example, the positive active material may have an operating potential in a range of about 4.3 V to about 5.0 V. For example, the positive active material may have an operating potential in a range of about 4.3 V to about 4.6 V. The positive active material having an operating potential within any of the above ranges may be included in a high voltage lithium battery.

The positive active material core particle may include, for example, $LiCoO_2$, $LiNiO$, $LiMnO_2$, $LiMn_2O_4$, $Li(Ni_aCo_b-Mn_c)O_2$ (where $0<a<1$, $0<b<1$, $0<c<1$, and $a+b+c=1$), $LiNi_{1-y}Co_yO_2$ (where $0 \leq y<1$), $LiCo_{1-y}Mn_yO_2$ (where $0 \leq y<1$), $LiNi_{1-y}Mn_yO_2$ (where $0 \leq y<1$), $LiMn_{2-z}Ni_zO_4$ (where $0<z<2$), $LiMn_{2-z}Co_zO_4$ (where $0<z<2$), $V_2O_5$, TiS, and/or MoS, but the present disclosure is not limited thereto, For example, a lithium-containing lithium transition metal oxide from among such positive active materials above may be used (utilized).

For example, the positive active material core particle may include an over-lithiated lithium transition metal oxide represented by Formula 6:

$$xLi_2MO_3\text{-}(1-x)LiM'O_2 \quad \text{Formula 6}$$

where, in Formula 6,

M is at least one metal having an average oxidation number of +4 and being selected from Group 4 transition metals and/or Group 5 transition metals, M' is at least one metal having an average oxidation number of +3 and being selected from Group 4 transition metals and Group 5 transition metals, and where:

$$0<x<1.$$

The over-lithiated lithium transition metal oxide may be represented by Formula 7:

$$xLi_2MnO_3\text{-}(1-x)LiNi_aCo_bMn_cO_2 \quad \text{Formula 7}$$

where, in Formula 7, $0<x<1$, $0<a<1$, $0<b<1$, $0<c<1$, and $a+b+c=1$.

The positive active material core particle may include one-body particles, but the present disclosure is not limited thereto. The term "one-body particle" used herein has a meaning different from that of the term "agglomerate", which refers to a plurality of small particles agglomerated via interparticle bonding. As used herein, the term "one-body particle" refers to a monolithic particle or a single particle present alone without having a grain boundary within the one-body particle. The positive active material core particle including such one-body particles may have a reduced specific surface area of the core particle, and accordingly, may further suppress (or reduce) a side reaction of the positive active material core particle with an electrolyte.

The positive active material core particle is not limited to one-body particles, but may also include secondary particles formed by an agglomeration of primary particles. The secondary particles may include pores or boundaries among (or between) the primary particles. Accordingly, the secondary particles may have high capacity due to the increase in specific surface area of the secondary particle (or positive active material core particle).

An average particle diameter of the positive active material core particle is not particularly limited. However, in the case of an average particle diameter that is too small, the positive active material core particle may have degraded cycle characteristics due to excessive reaction with the electrolyte solution. Alternatively, in the case of an average particle diameter that is too large, the positive active material core particle may have degraded (or reduced) dispersion stability of the positive active material during the formation of a positive electrode slurry, and may result in a positive electrode having a rough surface. For example, the positive active material core particle may have an average particle diameter in a range of about 1 μm to about 30 μm. In greater detail, the positive active material core particle may have an average particle diameter in a range of about 5 μm to about 25 μm, for example, about 10 μm to about 20 μm.

As used herein, the term "average particle diameter" refers to a particle size distribution "D50", which is the value of the particle diameter at 50% in the cumulative distribution curve if the number of total particles is considered to be 100% (the cumulative distribution curve showing particle size of the smallest particles to largest particles). D50 may be measured by a method generally used in the art, and for example, D50 may be measured using (utilizing) a particle size analyzer, or by transmission electron microscopy (TEM) imaging or scanning electron microscopy (SEM) imaging. Moreover, D50 may be easily measured by analyzing data measured by a measuring device which uses (utilizes) a dynamic light-scattering method to count the number of particles that correspond to each particle size range. Then, the counted number is calculated so as to obtain the average particle diameter.

The coating layer including the ceramic composite represented by Formula 1 below may be formed on a surface of (or at least partially surrounding) the positive active material core particle:

$$Li_{7+a}La_{3-b}Zr_{2-c}M_dO_{12+e} \quad \text{Formula 1}$$

where, in Formula 1,

M may be at least one element selected from Al, Ti, Sc, V, Y, Nb, Hf, Ta, Si, Ga, and Ge, and $-1 \leq a \leq 1$, $0 \leq b \leq 2$, $0 \leq c \leq 2$, $0 < d \leq 2$, and $0 \leq e \leq 1$.

The coating layer may include a ceramic-based composite material that may enable lithium ion conduction but may prevent (or reduce) penetration of a liquid electrolyte. The coating layer may be on (e.g., formed on) the positive active material core particle capable of intercalating and deintercalating lithium ions so as to suppress (or reduce) a direct reaction between the positive active material core particle and the electrolyte component. The coating layer may enable lithium ion conduction, and accordingly, may have no (or substantially no) degradation in rate property or have a very low rate property, as compared to a coating layer including a metal oxide of the related art.

The ceramic composite for forming the coating layer may be obtained by substituting a metal M for La and/or Zr within a Li—La—Zr—O backbone. An oxide, e.g., an inorganic oxide such as $Al_2O_3$ and $TiO_2$, of the metal M component may have insulating properties. However, when the metal M component is added to the Li—La—Zr—O backbone by substitution, the insulating properties of the inorganic oxide become ineffective (e.g., the ceramic composite is conductive). As a result of the insulating properties of the inorganic oxide becoming ineffective due to the addition of the metal M component to the Li—La—Zr—O backbone by substitution, the ceramic composite may be differentiated from a material formed by a simple combination of a Li—La—Zr—O ceramic base compound and the oxide of the metal M component. As such, according to embodiments of the present disclosure, the ceramic composite disclosed herein is not a physical mixture of a Li—La—Zr—O ceramic base compound and an oxide of a metal M.

In addition, the ceramic composite including the metal component M may have improved lithium ion conductivity as compared with a Li—La—Zr—O ceramic base compound that does not include the metal M component.

Stoichiometry of the ceramic composite of Formula 1 above may be adjusted according to the composition of the ceramic base compound used (utilized) as a raw material, the composition and amount of the added metal M component, and the processing conditions. The manufacturing method of the ceramic composite of Formula 1 is not particularly limited. The positive active material core particle on which the coating layer is formed may be manufactured by a variety of manufacturing methods, for example, a solid-phase method, a sol-gel method, a spray method, an emulsion method, a co-precipitation method, and a Pechini method, may be used (utilized), but the present disclosure is not limited thereto.

In some embodiments, the ceramic composite may be represented by Formula 2:

$$Li_{7+a'}La_{3-b'}Zr_{2-c'}M_{d'}O_{12+e'} \quad \text{Formula 2}$$

where M may be at least one metal selected from Al, Ti, Sc, V, Y, Nb, Hf, Ta, Si, Ga, and Ge, and
$-0.5 \leq a' \leq 0.5$, $0 \leq b' \leq 1$, $0 \leq c' \leq 1$, $0 < d' \leq 1$, and $0 \leq e' \leq 0.5$.

In some other embodiments, the ceramic composite may be represented by Formula 3:

$$Li_7La_{3-b''}Zr_2Al_{d''}O_{12} \quad \text{Formula 3}$$

where $0 < b'' \leq 2$ and $0 < d'' \leq 2$.

In some other embodiments, the ceramic composite may be represented by Formula 4:

$$Li_7La_3Zr_{2-c'''}Ti_{d'''}O_{12} \quad \text{Formula 4}$$

where $0 < c''' < 2$ and $0 < d''' < 2$.

In some other embodiments, the ceramic composite may be represented by Formula 5:

$$Li_7La_{3-x}Al_xZr_{2-y}Ti_yO_{12} \quad \text{Formula 5}$$

where $0 \leq x \leq 2$, $0 \leq y \leq 2$, and $0 < x+y \leq 2$.

The coating layer may be a uniform (or substantially uniform) and continuous (or substantially continuous) coating layer.

In some embodiments, the coating layer may be discontinuous. For example, the coating layer may be a discontinuous coating layer including islands (e.g., discrete or separate islands). The term "island" used herein refers to a shape having a predetermined (or set) volume, and examples thereof include a spherical, a semi-spherical, a non-spherical, or an irregular shape, but the present disclosure is not limited thereto. The discontinuous coating layer may include coating particles including the ceramic composite that are discontinuously coated, or may be irregular and have a constant volume due to a number of coating particles including the ceramic composite that are combined together.

The coating layer may include (or be formed of) the coating particles including the ceramic composite. The coating particles of the coating layer may have an average diameter in a range of, for example, about 100 nm to about 1,000 nm. The coating particles may have an average diameter in a range of, for example, about 200 nm to about 800 nm. The coating particles may have an average diameter in a range of, for example, about 400 nm to about 600 nm. The coating particles may be connected to (or fused to) one other without a boundary therebetween, and accordingly, a continuous coating layer may be formed. For example, the coating layer may completely (or substantially completely) surround the positive active material particle. Alternatively, the coating particles may not completely coat (or not completely surround) the positive active material core particle, and accordingly, a discontinuous coating layer may be formed. For example, the discontinuous coating layer may include or be islands (e.g., discrete or separate islands) of the coating particles.

The coating layer may have a thickness in a range of about 100 nm to about 1,000 nm. The coating layer may have a thickness in a range of, for example, about 100 nm to about 1,000 nm, about 200 nm to about 800 nm, or about 400 nm to about 600 nm.

The positive active material may include the coating layer at a mole ratio in a range of about 0.05 mol % to about 5 mol % based on 1 mole of the positive active material core particle. The positive active material may include the coating layer at a mole ratio in a range of, for example, about 0.1 mol % to about 2 mol %, or about 0.3 mol % to about 1 mol %, based on 1 mole of the positive active material core particle. The positive active material may minimize (or reduce) degradation of the rate properties thereof while realizing a certain (or suitable) level of capacity.

The above-described coating layer containing the ceramic composite may be formed on the positive active material core particle, and accordingly, a lithium battery having excellent cycle characteristics and rate properties may be manufactured.

Hereinafter, a method of manufacturing the positive active material according to embodiments of the present disclosure is described.

A method of manufacturing the positive active material may include:

preparing a mixed solution including a lanthanum (La) precursor, a zirconium (Zr) precursor, and an additive metal M (where M is at least one metal selected from Al, Ti, Sc, V, Y, Nb, Hf, Ta, Si, Ga, and Ge);

adding a weak acid selected from citric acid, lactic acid, acetic acid, formic acid, oxalic acid, uric acid, or a mixture thereof, to the mixed solution to prepare a coating solution; and applying a coating of the coating solution onto a surface of a positive active material core particle capable of intercalating and deintercalating lithium ions, and heat-treating the coating to prepare the positive active material.

The La precursor, the Zr precursor, and the additive metal M precursor are raw materials for forming the coating layer including the ceramic composite.

According to an embodiment, a lithium-containing lithium transition metal oxide may be used (utilized) as the positive active material core particle capable of intercalating and deintercalating lithium ions. Lithium, which is abundantly (or excessively) present on the surface of the positive active material core particle, may react with the La precursor, the Zr precursor, and the additive metal M precursor to form the ceramic composite of Formula 1 above. The lithium containing lithium transition metal oxide may include at least one selected from the examples of the positive active material that is capable of intercalating and deintercalating lithium ions.

Examples of the La precursor include La-containing nitrates, sulfates, carbonates, chlorides, acetates, and a combination thereof, but the present disclosure is not limited thereto.

Examples of the Zr precursor include Zr-containing nitrates, sulfates, carbonates, chlorides, acetates, and a combination thereof, but the present disclosure is not limited thereto.

Examples of the additive metal M precursor include metal M-containing nitrates, sulfates, carbonates, chlorides, acetates, and a combination thereof, but the present disclosure is not limited thereto.

The La precursor, the Zr precursor, and the additive metal M precursor may be included in the mixed solution in stoichiometric amounts according to the composition of the ceramic composite of the coating layer.

A solvent used in the mixed solution (or coating solution) is not particularly limited, and any suitable solvent available in the art may be used. The solvent may include, for example, water, ethanol, methanol, or a combination thereof, but the present disclosure is not limited thereto.

Here, the mixed solution (coating solution) may, optionally, further include a lithium salt, such as lithium nitrate ($LiNO_3$), lithium acetate ($CH_3COOLi$), lithium carbonate ($Li_2CO_3$), lithium hydroxide (LiOH), or a combination thereof, but the present disclosure is not limited thereto. The lithium salt may be used to regulate the amount of lithium included in the ceramic composite.

The weak acid, which may include citric acid, lactic acid, acetic acid, formic acid, oxalic acid, uric acid, or a combination thereof, may be added to the mixed solution including the raw materials to prepare the coating solution. Then, a metal complex for forming the ceramic composite may be formed from the reaction of the raw materials.

The mixed solution (or coating solution) may, optionally, further include isopropyl alcohol (IPA) having a good surface activity, n-butyl alcohol, terpineol, or sodium hexametaphosphate, in addition to the weak acid, to facilitate the dispersion of the raw materials and/or the metal complex.

Before the surface of the positive active material core particle capable of intercalating and deintercalating lithium ions is subjected to a coating treatment, the method may further include evaporating the solvent from the mixed solution (or coating solution). Once the solvent is evaporated, a gel (e.g., a yellow gel) may be obtained. Accordingly, the surface of the positive active material core particle capable of intercalating and deintercalating lithium ions may be coated with the gel.

Following the adding of the positive active material core particle capable of intercalating and deintercalating lithium ions into the mixed solution (or coating solution), or following the applying of the coating of the coating solution onto a surface of the positive active material core particle, the method may further include drying the mixed solution (or coating solution). The drying process is not particularly limited, but may be performed at a temperature in a range of about 100° C. to about 300° C.

The heat-treating of the positive active material core particle (or the coating) may be performed at a temperature in a range of about 600° C. to about 1,000° C., but the present disclosure is not limited thereto. For example, the heat-treating may be performed at a temperature in a range of about 700° C. to about 900° C., for about 2 to about 10 hours, but the present disclosure is not limited thereto.

According to another embodiment, the positive electrode may include the above-described positive active material. The positive electrode may include the above-described positive active material as the only positive active material in the positive electrode (e.g., the positive electrode may include the above-described positive active material alone). Alternatively, in addition to the above-described positive active material, the positive electrode may further include other positive active materials suitable for use in a positive electrode, such as, positive active materials having at least one different technical feature in terms of composition or particle diameter. An example of another positive active material suitable for use in a positive electrode includes a lithium-containing metal oxide, and any lithium-containing metal oxide suitable for use in a positive electrode.

The positive electrode may be, for example, manufactured by preparing a positive active material composition by mixing the above-described positive active material, a binder, and, optionally (or selectively), a conductive agent, with a solvent. Thereafter, the positive active material composition may be molded in a predetermined (or set) shape, or a positive electrode current collector may be coated with the positive active material composition.

The binder included in the positive active material composition may be a component to assist binding between the positive active material and the conductive agent, or to assist binding between the positive active material and the current collector. Examples of the binder include polyvinylidene fluoride, polyvinylidene chloride, polybenzimidazole, polyimide, polyvinyl acetate, polyacrylonitrile, polyvinylalcohol, carboxymethylcellulose (CMC), starch, hydroxypropylmethyl cellulose, regenerated cellulose, polyvinyl pyrrolidone, polyethylene, polypropylene, polystyrene, polymethylmethacrylate, polyaniline, acrylonitrile-butadiene-styrene, phenol resin, epoxy resin, polyethyleneterephthalate, polytetrafluorethylene, polyphenyl sulfide, polyamideimide, polyetherimide, polyethylenesulfone, polyacetal, polyphenylene oxide, polybutylene terephthalate, ethylene-propylene-diene terpolymer (EPDM), sulfonated EPDM, styrene-butadiene rubber, fluorocarbon rubber, and various copolymers, but the present disclosure is not limited thereto. Any suitable binder available in the art may be used. The amount of the binder may range from about 1 to about 50 parts by weight based on 100 parts by weight of the positive active material. For example, the amount of the binder may range from about 1 to about 30 parts by weight, about 1 to about 20 parts by weight, or about 1 to about 15 parts by weight, based on 100 parts by weight of the positive active material.

The conductive agent may be further, optionally (or selectively), included to improve electrical conductivity of the positive active material by providing a conductive pathway thereto. The conductive agent may include at least one of acetylene black, ketjen black, natural graphite, artificial graphite, carbon black, carbon fiber, metal powder or metal fiber, such as copper, nickel, aluminum, or silver, or a polyphenylene derivative, but examples of the conductive agent are not limited thereto. Any suitable conductive agent available in the art may be used. An amount of such conductive agent may be suitably adjusted. For example, the positive active material and the conductive agent may be added at a weight ratio in a range of about 99:1 to about 90:10.

Examples of the solvent include N-methylpyrrolidone, acetone, or water, but the present disclosure is not limited thereto. Any suitable solvent available in the art may be used. The amount of the binder may range from, for example, about 10 to 500 parts by weight based on 100 parts by weight of the positive active material. When the amount of the solvent is within the above range, an active material layer may be easily formed.

The positive active material composition may omit one or more of the conductive agent, the binder, and the solvent, according to the use and the configuration of the lithium battery.

The current collector may be formed to have a thickness in a range of about 3 μm to about 500 μm, but the present disclosure is not limited thereto. The current collector is not particularly limited as long as the current collector is conductive without causing adverse chemical changes in the manufactured battery. Examples of the current collector include copper, stainless steel, aluminum, nickel, titanium, sintered carbon, a copper surface, or a stainless steel surface-treated with carbon, nickel, titanium, or silver, or aluminum-cadmium alloys, but the present disclosure is not limited thereto. In addition, fine irregularities (e.g., surface roughness) may be included on the surface of the current collector so as to enhance adhesion of the surface of the current collector to the positive electrode active materials. In addition, the current collector may be used in various forms examples of which include, films, sheets, foils, nets, porous structures, foams, and non-woven fabrics, but the present disclosure is not limited thereto.

A coating of the formed positive active material composition may be directly applied onto an aluminum current collector to prepare a positive plate. Alternatively, the formed positive active material composition may be cast on a separate support, and then, the aluminum current collector may be laminated with a positive active material film exfoliated from the support to prepare a positive plate. The positive electrode is not limited to the forms described above, and may be in a form other than those described above.

A lithium battery according to another embodiment may include a positive electrode including the positive active material. The lithium battery may include a positive electrode including the positive active material; a negative electrode facing the positive electrode; a separator between the positive electrode and the negative electrode; and an electrolyte. The lithium battery may be manufactured as follows.

First, the positive electrode in the lithium battery may be manufactured according to the method of manufacturing the positive electrode described above.

Then, a negative electrode may be manufactured in the following manner. The negative electrode may be manufactured in the same manner as described with respect to the manufacture the positive electrode, except that a negative active material is used instead of the positive active material. In addition, a binder, a conductive agent, and/or a solvent may, optionally, be included in a negative active material composition and may be the same (or substantially the same) as those described with respect to the positive active material composition.

For example, a negative active material, a binder, a conductive agent, and/or a solvent are mixed to prepare a negative active material composition, and a coating of the negative active material composition may be directly applied onto a copper current collector to prepare a negative plate. Alternatively, the formed negative active material composition may be cast on a separate support, and then, the copper current collector may be laminated with a negative active material film exfoliated from the support to prepare a negative plate.

The negative active material may be any one of various suitable materials that are used as a negative active material for a lithium battery in the art. For example, the negative active material may include at least one selected from lithium metal, lithium-alloyable metal, transition metal oxide, non-transition metal oxide, and/or a carbonaceous material.

For example, the lithium-alloyable metal may include Si, Sn, Al, Ge, Pb, Bi, Sb, a Si—Y alloy (where Y is an alkali metal, an alkali earth metal, a Group 13 element, a Group 14 element, a Group 15 element, a Group 16 element, a transition metal, a rare-earth element, or a combination thereof, and Y is not Si), or an Sn—Y alloy (where Y is an alkali metal, an alkali earth metal, a Group 13 element, a Group 14 element, a Group 15 element, a Group 16 element, a transition metal, a rare-earth element, or a combination thereof, and Y is not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may include lithium titanium oxide, vanadium oxide, or lithium vanadium oxide.

For example, the non-transition metal oxide may include $SnO_2$, $SiO_x(0 \leq x \leq 2)$, or the like.

The carbonaceous material may include crystalline carbon, amorphous carbon, or a mixture thereof. The crystalline carbon may include natural or artificial graphite that is amorphous, tabular, flake-like, circular, or fibrous, and the amorphous carbon may include soft carbon or hard carbon, meso-phase pitch carbide, or calcined cork.

Then, a separator to be inserted between the positive electrode and the negative electrode may be prepared. The separator may be any one of various suitable separators that are available in the art for a lithium battery. For example, a material that has low resistance to ion migration of an electrolyte and has an excellent electrolytic solution retaining capability is suitable for forming the separator. For example, a material for forming the separator may be selected from glass fiber, polyester, Teflon, polyethylene, polypropylene, polytetrafluoroethylene (PTFE), or a combination thereof, each of which may be in a non-woven fabric or woven fabric form. Pores included in the separator may have a diameter in a range of about 0.01 μm to about 10 μm, and the separator may have a thickness in a range of about 5 μm to about 300 μm.

The separator may be, for example, manufactured in the following manner.

The separator may be prepared by mixing a polymer resin, a filler, and a solvent to form a separator composition. A coating of the separator composition may be directly applied onto an electrode, and the coating may be dried so as to form a separator. Alternatively, the separator composition may be cast on a support and dried, and the electrode may be laminated with a separator film exfoliated from the support to prepare a separator. The polymer resin used in the manufacture of the separator is not particularly limited, and may be any one of various suitable polymers that are available as a binding agent for an electrode plate. For example, the binding agent may include a vinylidene fluoride/hexafluoropropylene copolymer, polyvinylidenefluoride (PVDF), polyacrylonitrile, polymethylmethacrylate, or a mixture thereof.

Next, an electrolyte is prepared.

The electrolyte includes a non-aqueous electrolyte and a lithium salt. The non-aqueous electrolyte may include a non-aqueous electrolytic solution, an organic solid electrolyte, an inorganic solid electrolyte, or the like.

The non-aqueous electrolytic solution may include, for example, an aprotic organic solvent, and examples thereof include N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, 4-methyldioxolane, formamide, N,N-dimethylformamide, acetonitrile, nitromethane, methyl formate, methyl acetate, triester phosphate, trimethoxy methane, dioxolane derivative, sulfolane, methyl sulfolane, 1,3-dimethyl-2-imidazolidinone, propylene carbonate derivative, tetrahydrofuran derivative, ether, methyl propionate, and ethyl propionate.

The organic solid electrolyte may include, for example, a polyethylene derivative, a polyethylene oxide derivative, a polypropylene oxide derivative, a phosphate ester polymer, polyester sulfide, polyvinyl alcohol, poly fluoro vinylidene, or an ionic decomposer-containing polymer.

The inorganic solid electrolyte may include, for example, nitrides, halides, sulfates, and silicates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may include any one of various suitable lithium salts that are available in the art for a lithium battery. One or more lithium salts that are easily dissolved in the non-aqueous based electrolyte may be used, and examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, low aliphatic lithium carbonate, 4 phenyl lithium borate, lithium imide, and a mixture thereof.

In order to improve charge-discharge characteristics and flame retardancy of a lithium battery, the electrolytic solution may further include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, or trichloride aluminum. Optionally, in order to impart incombustibility of a lithium battery, the electrolytic solution may further include a halogen-containing solvent, such as carbon tetrachloride or ethylene trifluoride. Further, in order to improve high-temperature storage characteristics of a lithium battery, the non-aqueous electrolyte may further include carbon dioxide gas, fluoroethylene carbonate (FEC), propene sultone, or the like.

For example, in order to manufacture an electrolyte, lithium salts such as LiPF$_6$, LiClO$_4$, LiBF$_4$, and LiN(SO$_2$CF$_3$)$_2$ may be added to a mixed solvent of cyclic carbonates, such as ethylene carbonate (EC) and propylene carbonate (PC), which are high dielectric solvents, and linear carbonates, such as diethyl carbonate (DEC), dimethyl carbonate (DMC), and ethylmethyl carbonate (EMC), which are low viscosity solvents.

The lithium battery may be a lithium ion battery, a lithium ion polymer battery, or a lithium polymer battery, classified according to the composition of the separator and the electrolyte being used; a cylindrical battery, a rectangular battery, a coin-shape battery, or a pouch-shape battery, classified according to the shape of the battery; or a bulky battery or a thin-film battery, classified according to the size of the electrodes being used. In addition, the lithium battery may be a lithium primary battery or a lithium secondary battery.

The above-described batteries can be manufactured according to any suitable method available in the art, and thus, a detailed description thereof is not provided here.

FIG. 1 is a schematic view illustrating a lithium battery 30 according to an embodiment, but the present disclosure is not limited thereto.

Referring to FIG. 1, the lithium battery 30 includes a positive electrode 23, a negative electrode 22, and a separator 24 between the positive electrode 23 and the negative electrode 22. The positive electrode 23, the negative electrode 22, and the separator 24 are wound or folded to be placed in a battery case 25. Subsequently, an electrolyte is injected into the battery case 25 and the resultant structure is sealed with an encapsulation member 26, thereby completing the manufacturing of the lithium battery 30. The battery case 25 may be cylindrical, rectangular, or thin-film shaped. The lithium battery may be a lithium ion battery.

The lithium battery may be suitable for, in addition to existing mobile phones and portable computers, electric vehicles requiring a high capacity battery, a high-power output, and high temperature operation. Also, the lithium battery may be combined with any suitable internal combustion engine, fuel battery, or super capacitor for use in hybrid vehicles. In addition, the lithium battery may be suitable for any application requiring a high capacity battery, high output, high voltage, and high-temperature operation. Since the lithium battery has excellent high-rate characteristics and lifetime characteristics, the lithium battery is suitable for use in an electric vehicle (EV). For example, the lithium battery may be suitable for use in a hybrid vehicle such as a plug-in hybrid electric vehicle (PHEV).

Embodiments of the present disclosure are further described with reference to Examples and Comparative Examples. However, the Examples are presented herein for illustrative purposes only, and the present disclosure is not limited thereto.

Example 1

(1) Manufacturing of Positive Active Material

LiCoO$_2$ for use as a positive active material core particle was prepared in the following manner.

First, Li$_2$CO$_3$ was mixed with Co$_3$O$_4$ at a molar ratio of Li to Co of 1:1. The mixture was sintered in an oxygen atmosphere at 1,000° C. for 10 hours to obtain LiCoO$_2$. The sintered LiCoO$_2$ was pulverized by a pulverizer, and the pulverized powder was filtered through a sieve to prepare LiCoO$_2$ powder having an average particle diameter of about 15 μm.

Next, in order to form a ceramic composite coating layer, 3.11 g of La(NO$_3$)$_3$.xH$_2$O, 1.44 g of Zr(NO$_3$)$_2$.xH$_2$O, and 0.12 g of Al(NO$_3$)$_3$.9H$_2$O were added to 50 ml of deionized (DI) water, and stirred until completely (substantially completely) dissolved, thereby obtaining Solution A (e.g., a mixed solution).

A solution including 14.33 g of citric acid dissolved in 15 ml of DI water was mixed with Solution A, and then, the resultant coating solution was stirred at a temperature of 40° C. for 10 hours. Following the stirring, the solvent was evaporated from the coating solution at a temperature of 60° C., thereby obtaining a transparent (substantially transparent), yellow gel.

100 g of the LiCoO$_2$ powder was mixed with the gel at a temperature of 250° C., and the mixture was heat treated in an air atmosphere for 5 hours so as to obtain dried powder. The resultant dried powder was milled, and then, heat treated at a temperature of 800° C. for 10 hours in an air atmosphere. As a result, a positive active material in which the surface of the LiCoO$_2$ powder was coated with Li$_7$La$_{2.9}$Zr$_2$Al$_{0.1}$O$_{12}$ particles was obtained.

2) Manufacturing of Lithium Battery

The positive active material, a polyvinylidenefluoride (PVDF) binder, and a conductive agent (Denka Black) were mixed at a weight ratio of 90:5:5, and then, a N-methylpyrrolidone solvent was added thereto to have a solid content of 60 wt % and to control viscosity of the mixture so as to prepare a positive active material slurry.

An aluminum foil current collector, which has a thickness of 15 μm and a weight of 9 mg/cm$^2$, was coated with the positive active material slurry, and then, the resultant structure, i.e., the coated positive plate, was dried at a temperature of 120° C. for 15 minutes and pressed to manufacture a positive electrode.

A graphite particle as the negative active material was mixed with a PVDF binder at a weight ratio of 1:1, and then, a N-methylpyrrolidone solvent was added thereto to have a solid content was 60 wt % and to control viscosity of the mixture to prepare a negative electrode active material slurry.

A copper foil current collector, which has a thickness of 10 μm and a weight of 9 mg/cm$^2$, was coated with the negative electrode active material slurry, and then, the resultant structure, i.e., the coated negative plate, was dried at a temperature of 120° C. for 15 minutes and pressed to manufacture a negative electrode.

A coin full cell including the positive electrode, the negative electrode, a polyethylene separator (STAR 20, available from Asahi), and 1.15M $LiPF_6$ dissolved in a mixed solvent of ethylene carbonate (EC):ethylmethyl carbonate (EMC):diethyl carbonate (DEC) (at a volume ratio of 3:3:4) as an electrolyte, was prepared.

Example 2

A positive active material and a coin full cell were manufactured as in Example 1, except that the surface of the $LiCoO_2$ powder was coated with $Li_7La_{2.7}Zr_2Al_{0.3}O_{12}$ particles using (utilizing) 3.732 g of $La(NO_3)_3.6H_2O$, 1.728 g of $Zr(NO_3)_2.xH_2O$, and 0.144 g of $Al(NO_3)_3.9H_2O$.

Example 3

A positive active material and a coin full cell were manufactured as in Example 1, except that the surface of the $LiCoO_2$ powder was coated with $La_{2.5}Zr_2Al_{0.5}O_{12}$ particles using (utilizing) 4.354 g of $La(NO_3)_3.6H_2O$, 2.016 g of $Zr(NO_3)_2.xH_2O$, and 0.168 g of $Al(NO_3)_3.9H_2O$.

Comparative Example 1

A coin full cell was manufactured as in Example 1, except that $LiCoO_2$ powder was used as a positive active material, without the coating treatment.

Comparative Example 2

First, $Li_7La_{2.9}Zr_2Al_{0.1}O_{12}$ particles were manufactured in the following manner:

1.51 g of $LiNO_3$, 3.11 g of $La(NO_3)_3.6H_2O$, 1.44 g of $Zr(NO_3)_2.xH_2O$, and 0.12 g of $Al(NO_3)_3.9H_2O$ were dissolved in 50 ml of DI water and stirred until completely (substantially completely) dissolved, thereby obtaining Solution A (e.g., a mixed solution). A solution including 14.33 g of citric acid dissolved in 15 ml of DI water was mixed with Solution A, and then, the resultant coating solution was stirred at a temperature of 40° C. for 10 hours. Following the stirring, the solvent was evaporated from the coating solution at a temperature of 60° C., thereby obtaining a yellow gel. Then, the resultant gel was heat treated at a temperature of 250° C. for 5 hours in an air atmosphere, thereby obtaining dried powder. The resultant dried powder was milled, and then, heat treated at a temperature of 800° C. for 10 hours in an air atmosphere, thereby obtaining $Li_7La_{2.9}Zr_2Al_{0.1}O_{12}$ particles (having an average particle diameter of up to 500 nm).

A coin full cell was manufactured as in Example 1, except that 100 g of the $LiCoO_2$ powder manufactured as a positive active material in Example 1 was simply mixed (physically mixed) with 6 g of the resultant $Li_7La_{2.9}Zr_2Al_{0.1}O_{12}$ particles.

Evaluation Example 1

Confirmation of Coating Conditions

Figure 2A:
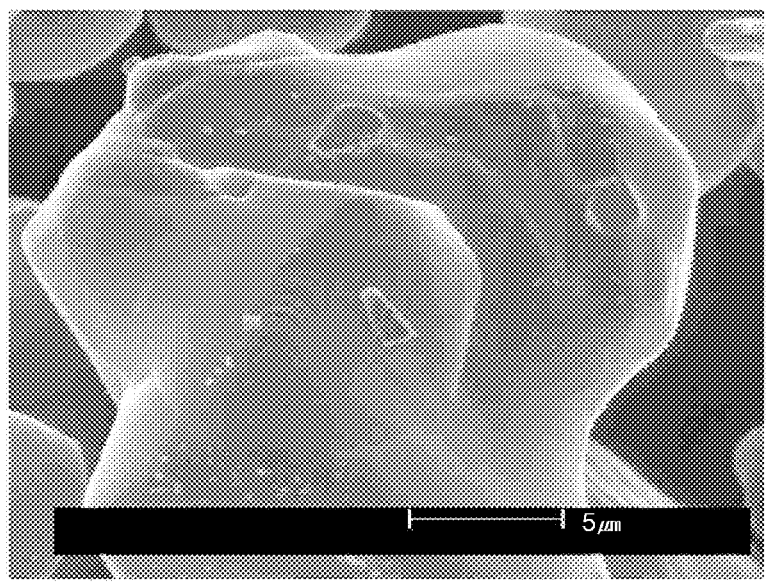
FIGS. 2A and 2B are scanning electronic microscope (SEM) images of $LiCoO_2$ powder prepared as in Example 1, before and after a coating layer is formed, respectively.
Figure 2B:
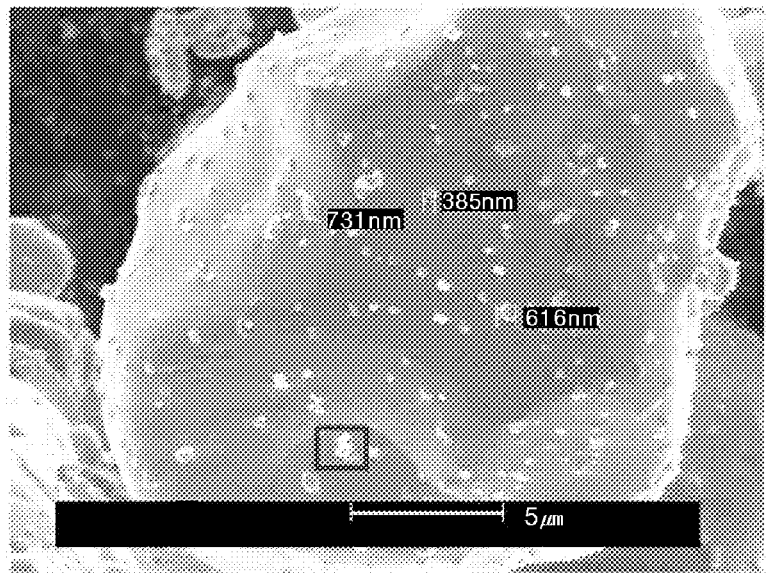

In order to confirm the coating conditions of the positive active material of Example 1, scanning electron microscope (SEM) images which show the $LiCoO_2$ powders before the coating and after the coating are shown in FIGS. 2A and 2B.

Referring to FIGS. 2A and 2B, it was confirmed that a discontinuous coating of the ceramic composite nanoparticles including islands was applied to the surface of the $LiCoO_2$ powder after the coating and the sintering of the same.

Figure 3:
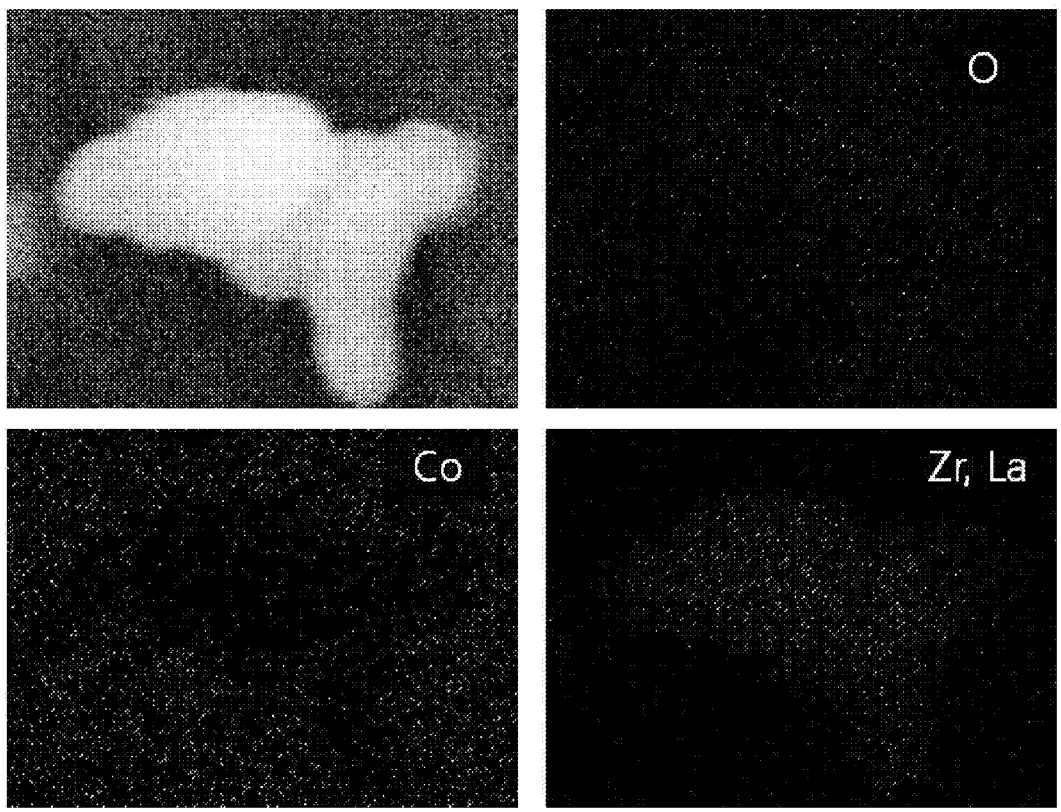
FIG. 3 is an energy dispersive X-ray spectroscopy (SEM-EDS) image showing observations on the distribution of coating materials on the positive active material prepared as in Example 1.

In order to confirm the distribution of coating material elements for the positive active material of Example 1, the results of energy dispersive X-ray spectroscopy (SEM-EDS) observations are shown in FIG. 3. Referring to FIG. 3, Co component are not present on a portion on which the coating particles were formed, whereas Zr and La component are present on a portion on which the coating particles were formed. In addition, it was confirmed that O component are uniformly distributed on both the core particle and coating particles.

Evaluation Example 2

Lifetime Properties Evaluation

The coin full cells of Examples 1-3 and Comparative Examples 1-2 were charged by flowing a constant current at 0.1 C rate at a temperature of 25° C. until the voltages of the coin full cells reached 4.6 V (vs. Li), and then discharged at the same current flow rate as that of the charging until the voltages reached 3.0 V (vs. Li) (formation process).

Following the formation process, the coin full cells were charged by flowing a constant current at 1 C rate at a temperature of 45° C. until the voltages of the coin full cells reached 4.6 V (vs. Li), and then discharged at the same current flow rate as that of the charging until the voltages reached 3 V (vs. Li). Then, the cycles of charging and discharging were repeated 70 times.

Figure 4:
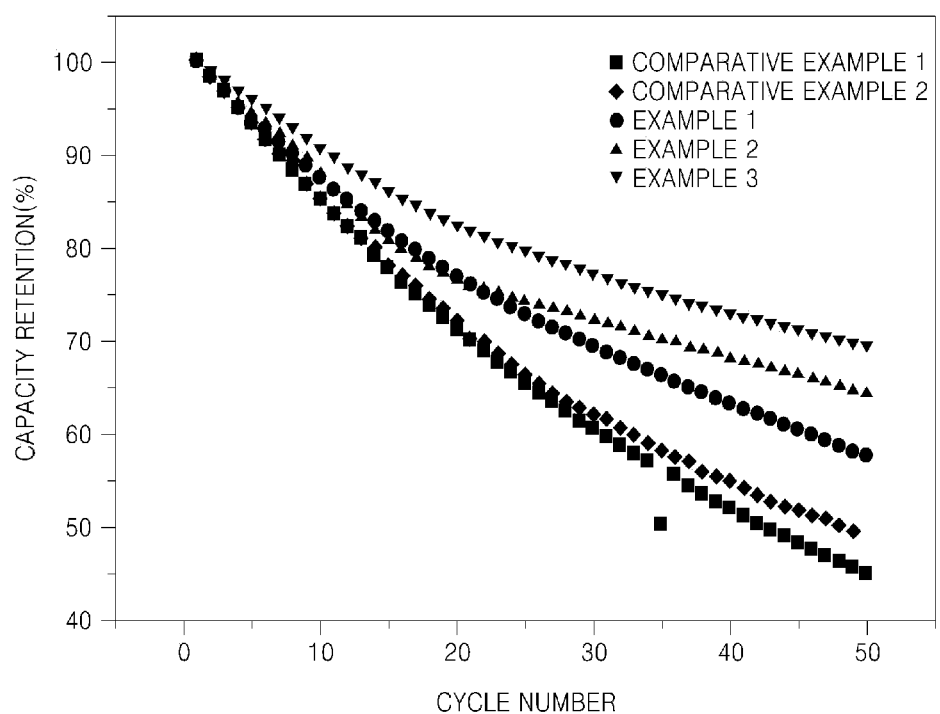
FIG. 4 is a graph showing lifetime properties of lithium batteries prepared according to Comparative Examples 1 and 2 and Examples 1 to 3.

The capacity retention ratios (CRRs) of the coin cells of Examples 1-3 and Comparative Examples 1-2 are shown in FIG. 4. The CRR is defined by Equation 1 below Capacity retention ratio[%]=[discharging capacity at each cycle/discharging capacity at $1^{st}$ cycle]× 100    Equation 1

Referring to FIG. 4, it was confirmed that the ceramic composite including the Al-substituted $Li_7La_{3-x}Zr_2Al_xO_{12}$ composition have improved lifetime properties of a lithium battery as compared to the positive active material of Comparative Example 1 that was manufactured without the coating treatment, or the positive active material of Comparative Example 2 that was manufactured by a simple mixture (physical mixture) of materials.

Evaluation Example 3

Rate Properties Evaluation

The coin full cells of Examples 1-3 and Comparative Examples 1-2 were charged by flowing a constant current at 0.1 C rate at a temperature of 25° C. until the voltages of the coin full cells reached 4.6 V (vs. Li), and then discharged at the same current flow rate as that of the charging until the voltages reached 3.0 V (vs. Li) (formation process).

Following the formation process, the coin full cells were charged by flowing a constant current at 0.2 C rate at a temperature of 25° C. until the voltages of the coin full cells reached 4.6 V (vs. Li), and then discharged at the same current flow rate as that of the charging. The coin full cells were also charged and discharged by flowing a constant current at 0.5 C, 1 C, or 2 C until the voltages reached 4.6 V so as to obtain the capacity retention ratios thereof for rate properties evaluation.

The results of the rate properties evaluation of the coin full cells of Comparative Examples 1-2 and Examples 1-3 at 0.1 C, 0.2 C, 0.5 C, 1 C and 2 C, and a ratio of the rate properties at 1 C/0.1 C and 2 C/0.2 C are shown in Table 1 below as 0.1D, 0.2D, 0.5D, 1D, 2D, 1D/0.1D, and 2D/0.2D, respectively.

TABLE 1

| Sample Name | Rate properties | | | | | | |
|---|---|---|---|---|---|---|---|
| | 0.1D | 0.2D | 0.5D | 1D | 2D | 1D/0.1D | 2D/0.2D |
| Comparative Example 1 | 100% | 93.8 | 90.5 | 86 | 79.8 | 90 | 85 |
| Comparative Example 2 | 100% | 94.5 | 92.0 | 90.5 | 84.2 | 90.5 | 86 |
| Example 1 | 100% | 96.7 | 94.1 | 92 | 85.1 | 92 | 88 |
| Example 2 | 100% | 97.3 | 94.7 | 92.5 | 87.2 | 92.5 | 89 |
| Example 3 | 100% | 98.1 | 95.4 | 92.6 | 88.4 | 93 | 90 |

As shown in Table 1, it was confirmed that the coin full cells in which the coating treatment was performed had excellent rate properties as compared to those in which the coating treatment was not performed or those formed by a simple combination (physical mixture) of an active material that is not coated with the coating layer and the ceramic composite.

As described above, according to the one or more of the above embodiments of the present disclosure, a lithium battery including a positive active material may have improved lifetime properties and rate capabilities.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims, and equivalents thereof.

What is claimed is:

1. A positive active material comprising:
   a positive active material core particle for intercalating and deintercalating lithium ions; and
   a coating layer at least partially surrounding the positive active material core particle and comprising a ceramic composite represented by Formula 1:

$$Li_{7+a}La_{3-b}Zr_{2-c}M_dO_{12+e}$$ Formula 1 wherein M comprises at least one selected from aluminum (Al), titanium (Ti), scandium (Sc), vanadium (V), yttrium (Y), niobium (Nb), hafnium (Hf), tantalum (Ta), silicon (Si), gallium (Ga), and germanium (Ge), and
   −1≤a≤1, 0≤b≤2, 0≤c≤2, 0<d≤2, and 0≤e≤1.

2. The positive active material of claim 1, wherein the ceramic composite is represented by Formula 2:

$$Li_{7+a'}La_{3-b'}Zr_{2-c'}M_{d'}O_{12+e'}$$ Formula 2 wherein M comprises at least one selected from Al, Ti, Sc, V, Y, Nb, Hf, Ta, Si, Ga, and Ge, and
   −0.5≤a'≤0.5, 0≤b'≤1, 0≤c'≤1, 0≤d'≤1, and 0≤e'≤0.5.

3. The positive active material of claim 1, wherein the ceramic composite is represented by Formula 3:

$$Li_7La_{3-b''}Zr_2Al_{d''}O_{12}$$ Formula 3 wherein 0<b''≤2 and 0<d''≤2.

4. The positive active material of claim 1, wherein the ceramic composite is represented by Formula 4:

$$Li_7La_3Zr_{2-c'''}Ti_{d'''}O_{12}$$ Formula 4 wherein 0<c'''<2 and 0<d'''<2.

5. The positive active material of claim 1, wherein the ceramic composite is represented by Formula 5:

$$Li_7La_{3-x}Al_xZr_{2-y}Ti_yO_{12}$$ Formula 5 wherein 0≤x≤2, 0≤y≤2, and 0<x+y≤2.

6. The positive active material of claim 1, wherein the coating layer is discontinuous.

7. The positive active material of claim 1, wherein the coating layer comprises coating particles comprising the ceramic composite.

8. The positive active material of claim 7, wherein the coating particles have an average particle diameter in a range of about 100 nm to about 1,000 nm.

9. The positive active material of claim 1, wherein the coating layer has a thickness in a range of about 100 nm to about 1,000 nm.

10. The positive active material of claim 1, wherein the positive active material core particle comprises at least one selected from $LiCoO_2$; $LiNiO$; $LiMnO_2$; $LiMn_2O_4$; $Li(Ni_aCo_bMn_c)O_2$, wherein 0<a<1, 0<b<1, 0<c<1, a+b+c=1; $LiNi_{1-y}Co_yO_2$, wherein 0≤y<1; $LiCo_{1-y}Mn_yO_2$, wherein 0≤y<1; $LiNi_{1-y}Mn_yO_2$, wherein 0≤y<1; $LiMn_{2-z}Ni_zO_4$, wherein 0<z<2; $LiMn_{2-z}Co_zO_4$, wherein 0<z<2; $V_2O_5$; $TiS$; and $MoS$.

11. The positive active material of claim 1, wherein the positive active material has an operating potential in a range of about 4.0 V to about 5.5 V.

12. The positive active material of claim 1, wherein the positive active material core particle has an average particle diameter in a range of about 1 μm to about 30 μm.

13. The positive active material of claim 1, wherein the coating layer is present in the positive active material at a mole ratio in a range of about 0.05 to about 5 mol % based on 1 mole of the positive active material core particle.

14. A lithium battery comprising the positive active material of claim 1.

15. A method of manufacturing a positive active material according to claime 1, the method comprising:
   preparing a mixed solution comprising a lanthanum (La) precursor, a zirconium (Zr) precursor, and an additive metal M, wherein M comprises at least one selected from Al, Ti, Sc, V, Y, Nb, Hf, Ta, Si, Ga, and Ge;
   adding a weak acid comprising citric acid, lactic acid, acetic acid, formic acid, oxalic acid, uric acid, or a mixture thereof, to the mixed solution to prepare a coating solution;
   applying a coating of the coating solution onto a surface of a positive active material core particle capable of intercalating and deintercalating lithium ions; and
   heat-treating the coating to prepare the positive active material.

16. The method of claim 15, wherein the positive active material core particle capable of intercalating and deintercalating lithium ions comprises a lithium transition metal oxide.

17. The method of claim 15, wherein the coating solution further comprises a dispersing agent comprising isopropyl alcohol (IPA), n-butyl alcohol, terpineol, sodium hexametaphosphate, or a mixture thereof.

18. The method of claim 15, wherein the coating solution further comprises a solvent, and the method further comprises evaporating the solvent from the coating solution before the applying of the coating of the coating solution onto the surface of the positive active material core particle capable of intercalating and deintercalating lithium ions.

19. The method of claim 15, further comprising drying the coating of the coating solution at a temperature in a range of about 100° C. to about 300° C. between the applying of the coating of the coating solution onto the surface of the positive active material core particle capable of intercalating and deintercalating lithium ions and the heat-treating.

20. The method of claim 15, wherein the heat-treating is performed at a temperature in a range of about 600° C. to about 1,000° C.

* * * * *